US006328213B1

United States Patent
He et al.

(10) Patent No.: US 6,328,213 B1
(45) Date of Patent: Dec. 11, 2001

(54) METHOD OF PROCESSING AN ANALOG ELECTRICAL SIGNAL CONTAINING INFORMATION REPRESENTATIVE OF REFLECTED LIGHT FROM CODED INDICIA, WHEREIN THE ELECTRICAL SIGNAL CONTAINS EDGE TRANSITIONS

(75) Inventors: Duanfeng He, Farmingville; Eugene Joseph, Coram, both of NY (US)

(73) Assignee: Symbol Technologies, Inc., Holtsville, NY (US)

( * ) Notice: Subject to any disclaimer, the term of this patent is extended or adjusted under 35 U.S.C. 154(b) by 0 days.

(21) Appl. No.: 09/096,164

(22) Filed: Jun. 12, 1998

(51) Int. Cl.[7] .............................. G02B 26/10; G06K 7/10; G06K 9/22; G06K 19/06
(52) U.S. Cl. ............................... 235/462.25; 235/462.16; 235/462.12
(58) Field of Search ................... 235/453.16, 462.12, 235/463.06, 462.28, 454, 462.47

(56) References Cited

U.S. PATENT DOCUMENTS

| | | | |
|---|---|---|---|
| 4,000,397 | * 12/1976 | Herbert et al. | 235/462.06 |
| 5,302,813 | 4/1994 | Goren | 235/462 |
| 5,329,105 | 7/1994 | Klancnik et al. | 235/463 |

(List continued on next page.)

FOREIGN PATENT DOCUMENTS 0 821 317 A2   1/1998   (EP) .

OTHER PUBLICATIONS den Dekker er al., "Resolution: a survey," J. Opt. Soc. Am. A, 14(3),547, 1997.
Frieden, "Probability, Statistical Optics, and Data Testing," Springer–Verlag, Berlin, 1983.
Goodman, "Introduction to Fourier optics," McGraw–Hill, San Francisco, 1968.
Joseph et al., "Bar Code Waveform Recognition Using Peak Locations," IEEE. Trans. Patt. Ana. & Mach. Intellig., 16(6), 630, Jun. 1994.
Joseph, "Recognition and restoration of blurred bilevel waveforms," Ph.D. dissertation, CS Dept. SUNY Stony Brook, NY, 1992.
Palmer, "The Bar Code Book," Helmers Publishing, Peterborough, NH, 1991.
Pratt, "Digital Image Processing," John Wiley & Sons, New York, 1978.
Puetter, "Information, Language, and pixon–based image reconstruction," Proc. SPIE, 2827, 12, 1994.
Shellhammer et al., "Selective Sampling the Edge Enhancement in Bar Code Laser Scanning," Proc. SPIE. 2660, 355, 1996.
Stern et al., "Analytical method to calculate optical transfer function for image motion and vibrations using moments,"J. Opt. Soc. Am. A., 14(2), 388, 1997.
Tsi et al., "System analysis of CCD–based bar code readers, "Appl. Opt., 32(19), Jul. 1993.
van der Gracht et al., "Broadband behavior of an optical–digital focus–invariant system," Opt. Lett., 21 (13), 919, 1996.

*Primary Examiner*—Karl D. Frech

(57) ABSTRACT

Processing an analog electrical signal containing information representative of reflected light from indicia including regions of different light reflectivity, wherein the analog electrical signal contains edge transitions corresponding to boundaries between adjoining regions of different light reflectivity of the indicia. The edge transitions of at least a part of the analog electrical signal are analyzed to determine a level of blur in that part of the electrical signal. Based on the determined level of blur, one of a plurality of different techniques is selected for processing that part of the electrical signal to produce a digitized electrical signal in which transitions in the digital level of the signal correspond to boundaries between adjoining regions of different light reflectivity of the indicia.

24 Claims, 16 Drawing Sheets

U.S. PATENT DOCUMENTS

| | | | |
|---|---|---|---|
| 5,352,878 | * 10/1994 | Smith et al. | 235/462.06 |
| 5,389,770 | 2/1995 | Ackley | 235/462 |
| 5,449,893 | 9/1995 | Bridgelall et al. | 235/462 |
| 5,478,997 | * 12/1995 | Bridgelall et al. | 235/462.06 |
| 5,486,689 | 1/1996 | Ackley | 235/463 |
| 5,504,318 | * 4/1996 | Joseph et al. | 235/462.06 |
| 5,514,858 | 5/1996 | Ackley | 235/462 |
| 5,539,191 | 7/1996 | Ackley | 235/462 |
| 5,608,201 | * 3/1997 | Coleman, Jr. | 235/462.06 |
| 5,734,152 | 3/1998 | Goren et al. | 235/462 |
| 5,902,987 | * 5/1999 | Coffman et al. | 235/462.12 |
| 5,923,023 | * 7/1999 | Arends et al. | 235/462.25 |
| 5,925,868 | * 7/1999 | Arends et al. | 235/454 |

* cited by examiner

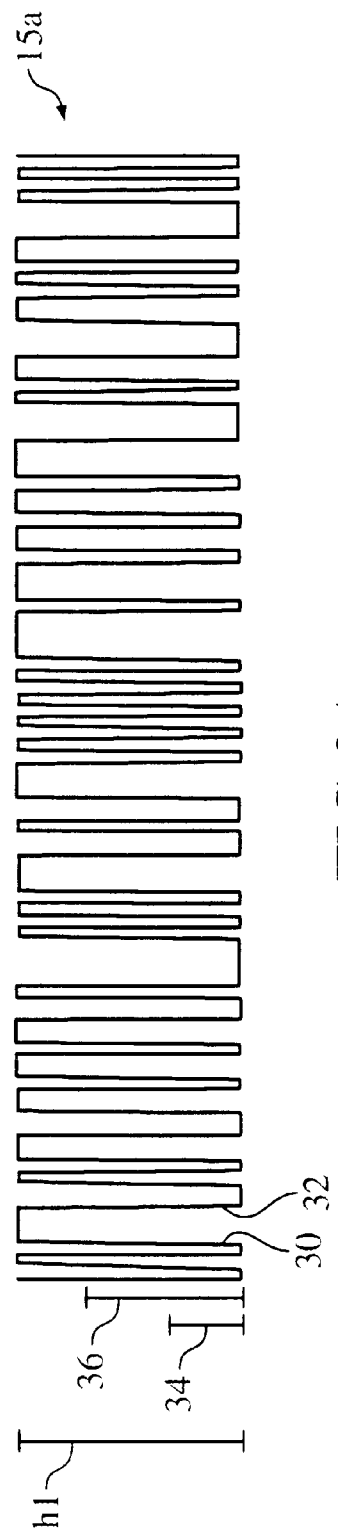
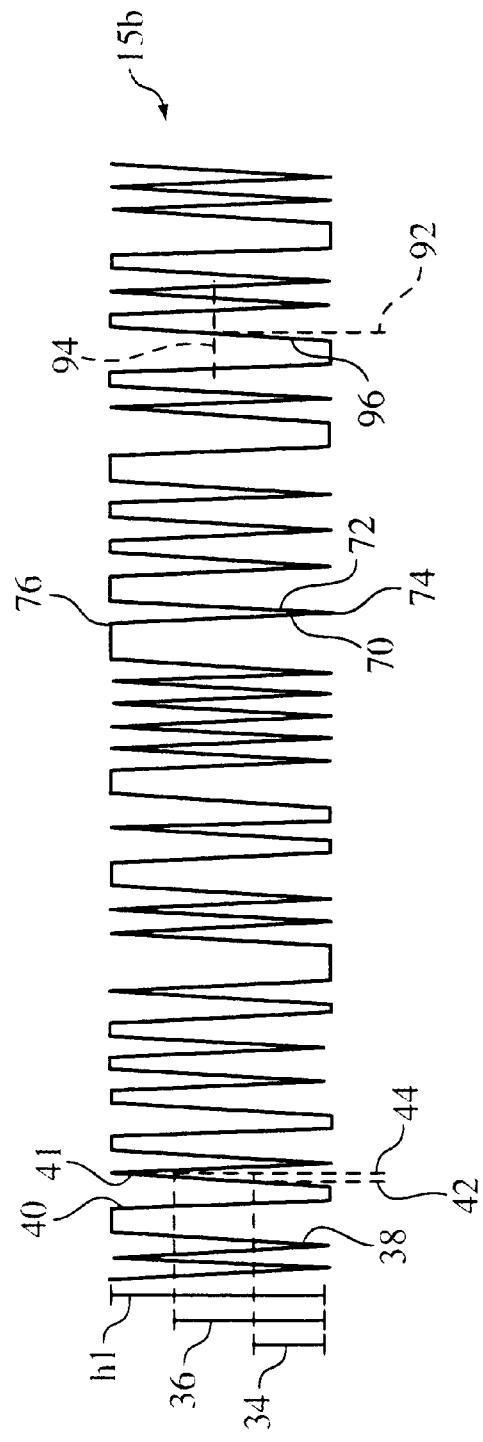
FIG 3A
FIG 3B

METHOD OF PROCESSING AN ANALOG ELECTRICAL SIGNAL CONTAINING INFORMATION REPRESENTATIVE OF REFLECTED LIGHT FROM CODED INDICIA, WHEREIN THE ELECTRICAL SIGNAL CONTAINS EDGE TRANSITIONS

BACKGROUND OF THE INVENTION

The invention relates to digitizing bar code symbol data.

Bar codes symbols are graphical objects that encode information as alternating dark and light portions, i.e., alternating regions of different light reflectivity, having specific relative widths. Bar code scanners have a wide range of applications, including reading bar code symbols provided on products. From analog electrical signals containing information representative of reflected light from the bar code symbols, the scanners produce digitized electrical signals that are typically fed to computing apparatus for decoding and providing an identification of the product to which the bar code symbol is applied. Examples of bar code symbols and scanners are found in almost every supermarket, convenience store, and department store, as well as in warehouses and factories that use bar code symbols and scanners for inventory and production control.

To decode the information, the bar code scanner must determine the relative widths of the dark and light portions to an effective degree of accuracy. Typically, if the scanner acquires a representation of the bar code symbol in which the symbol is blurred (e.g., due to optical or electrical filtering or being out-of-focus), decoding the information is difficult because the transitions between the dark and light portions (i.e., boundaries between the adjoining regions of different light reflectivity) become indistinct, which complicates the determination of the relative widths.

SUMMARY OF THE INVENTION

The invention provides a method and a system for use in digitizing blurred signals representative of bar code symbols by taking into account characteristics specific to bar code symbols, thereby improving the working range and effective resolving power of a bar code scanner by allowing the scanner to decode symbol images acquired at distances or under conditions that cause blurring of the analog signal representing the scanned symbol. Such blurring could result from out-of-focus optics, undersampling, poorly printed symbols, low pass filtering of the analog signal, or other causes. The invention also improves decoding accuracy in the presence of low and high frequency noise.

In a first aspect, the invention features processing an analog electrical signal containing information representative of reflected light from indicia including regions of different light reflectivity, wherein the analog electrical signal contains edge transitions corresponding to boundaries between adjoining regions of different light reflectivity of the indicia. Edge transitions of at least a part of the analog electrical signal are analyzed to determine a level of blur in that part of the electrical signal. Based on the determined level of blur, one of a plurality of different techniques is selected for producing the digitized signal (in which transitions in the digital level of the signal correspond to boundaries between adjoining regions of different light reflectivity of the indicia).

One or more of the following features may be incorporated in preferred implementations of the invention: The step of analyzing the edge transitions may be performed on a plurality of different parts of the analog electrical signal, and different digitizing techniques may be used on the different parts of the analog signal depending on the level of blur in the different parts of the analog signal. The edge transitions may be ranked by magnitude, and ranked edge transitions may be analyzed to detect the extent of blur represented in the part of the electrical signal. The ranking may be done by forming a histogram of the magnitudes of the edge transitions. A decision that significant blurring exists may be based on the analog electrical signal having edge transitions of substantially different magnitudes. Edge transitions having less than a threshold magnitude may be rejected. The edge transitions may be grouped into sets by magnitude, and whether the difference between a first magnitude associated with a first set and a second magnitude associated with a second set is substantially equal to the difference between the first magnitude and a third magnitude associated with a third set may be tested.

In a second aspect, the invention features determining whether an edge transition corresponds to a boundary between adjoining regions of substantially equal width; and based on the determination, producing the digitized electrical signal.

One or more of the following features may be incorporated in preferred implementations of the invention: Whether at least a part of the electrical signal is inconsistent with an alternating dark-and-light feature of a bar code symbol may be determined. If an inconsistency is found, at least that part of the analog electrical signal may be rejected. Whether a part of the analog electrical signal crosses a magnitude threshold more than once may be determined. If a part is found to cross the magnitude threshold more than once, at least that part of the analog electrical signal may be rejected. The extent to which an edge transition that corresponds to a boundary between two adjoining regions of different widths is affected by one of the regions may be determined.

In a third aspect, the invention features determining that the analog electrical signal contains edge transitions corresponding to less than all of the boundaries between the adjoining regions of different light reflectivity of the indicia; for at least part of the analog electrical signal, determining the number of boundaries that lack corresponding edges; and based on the determination about the number of boundaries that lack corresponding edges, producing the digitized electrical signal.

One or more of the following features may be incorporated in preferred implementations of the invention: Information about the relative positioning of the boundaries that lack corresponding edge transitions may be- determined. Information about the relative positioning of at least three boundaries that lack corresponding edge transitions may be determined. Information about the relative positioning of boundaries that lack corresponding edge transitions, between regions of dissimilar light reflectivity of the indicia may be determined. The relative positioning may be determined with respect to intermediate points in the regions. Information about the relative positioning of boundaries that lack corresponding edge transitions, between regions of similar light reflectivity of the indicia may be determined. Relative positioning may be determined with respect to intermediate points in the regions.

In a fourth aspect, the invention features determining the relative heights of edge transitions in the analog electrical signal; and depending on the relative heights, selecting one of a plurality of different techniques for processing the electrical signal to produce the digitized electrical signal.

In a fifth aspect, the invention features analyzing the edge transitions to classify at least a part of the analog electrical signal into one of three categories corresponding to slight, moderate, or severe levels of blur in that part of the analog electrical signal; if the part of the analog electrical signal is classified into the category corresponding a slight level of blur or into the category corresponding to a moderate level of blur, based on halfheight points in edge transitions in the analog electrical signal, determining information about the relative positions of boundaries between adjoining regions of different light reflectivity of the indicia; if the part of the analog electrical signal is classified into the category corresponding a severe level of blur, based on a determination about the number of regions disposed between regions about which relative positioning information is known, determining information about the relative positions of boundaries between adjoining regions of different light reflectivity of the indicia; and based on the information determined about the relative positions, producing the digitized electrical signal.

In a sixth aspect, the invention features processing the electrical signal to determine a set of possible edge transition points in said signal; classifying at least some of the edge transition points against a predetermined amplitude and frequency threshold into at least two categories corresponding to the frequency spectrum or blur of the signal associated with each edge transition point; and separately processing each set of edge transition points in each category as a result of the classifying step, and combining the result to produce the digitized electrical signal.

In a seventh aspect, the invention features detecting edge transitions in the analog scan signal; determining the level of blur in the vicinity of each of a plurality of edge transitions; digitizing the edge transitions differently based on the determined level of blur in the vicinity of the edge transition; combining the results of the digitizing step to produce a digitized electrical signal from the analog scan signal.

Other advantages and features will become apparent from the following description and from the claims.

BRIEF DESCRIPTION OF THE DRAWINGS

FIGS. 3A–3E and 17 are illustrations of the effects of defocusing on a bar code symbol.

DESCRIPTION OF THE PREFERRED EMBODIMENTS

Figure 1:
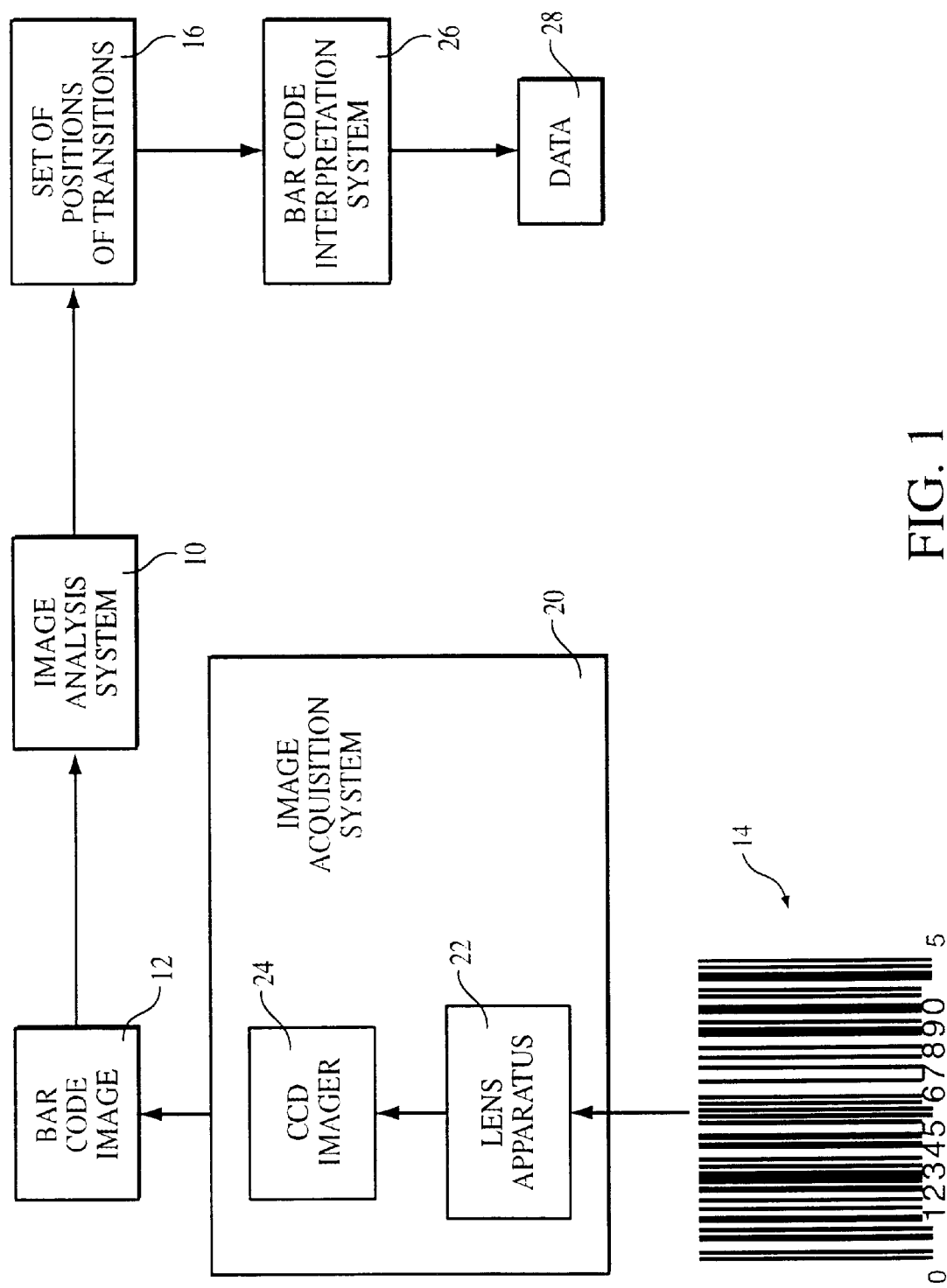
FIG. 1 is a block diagram of a bar code handling system including an image analysis system.
Figure 2:
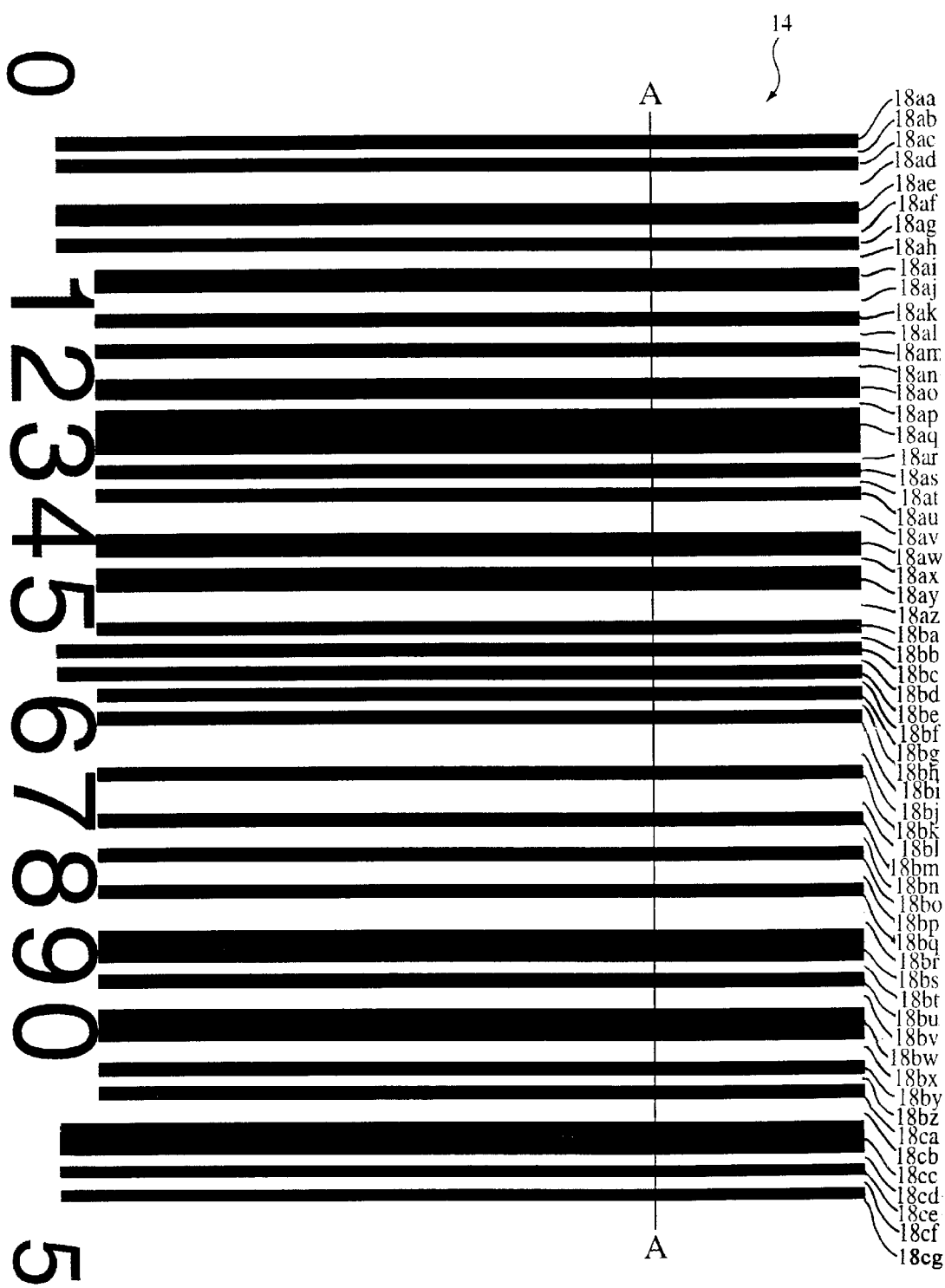
FIG. 2 is an illustration of a bar code symbol.

FIG. 1 illustrates an image analysis system 10 that processes a bar code image 12 representing a bar code symbol (e.g., symbol 14), to determine a set 16 of positions of transitions between portions (e.g., portions 18aa–18cg in FIG. 2) of the bar code symbol. The bar code image is provided by an image acquisition system 20 that may include a lens apparatus 22 and a CCD imager 24, and a bar code interpretation system 26 may derive data 28 (e.g., a serial number) from the set of positions. The image analysis system is able to determine the set of positions even if the bar code image, or signal representing the image, is blurred, by relying on characteristics of blurred bar code images, as described below.

In a specific embodiment described herein, the positions that are determined are relative in that the positions indicate relationships among the transitions and are not used to determine absolute distances between transitions or absolute widths of portions of the bar code symbol. The determination of the relative positions allows ratios of absolute distances or ratios of absolute widths to be calculated, which ratios are sufficient for decoding the bar code symbol. For example, the bar code symbol can be decoded without having to determine the absolute size of the bar code symbol or the absolute distance between the CCD imager and the bar code symbol and without having to refer to a scaling key in or near the symbol. Thus, as used herein, indications of spatial characteristics within the bar code symbol (e.g., position, width, distance, and size) refer to relative spatial characteristics (e.g., relative position, relative width, relative distance, and relative size, respectively).

Figure 18:
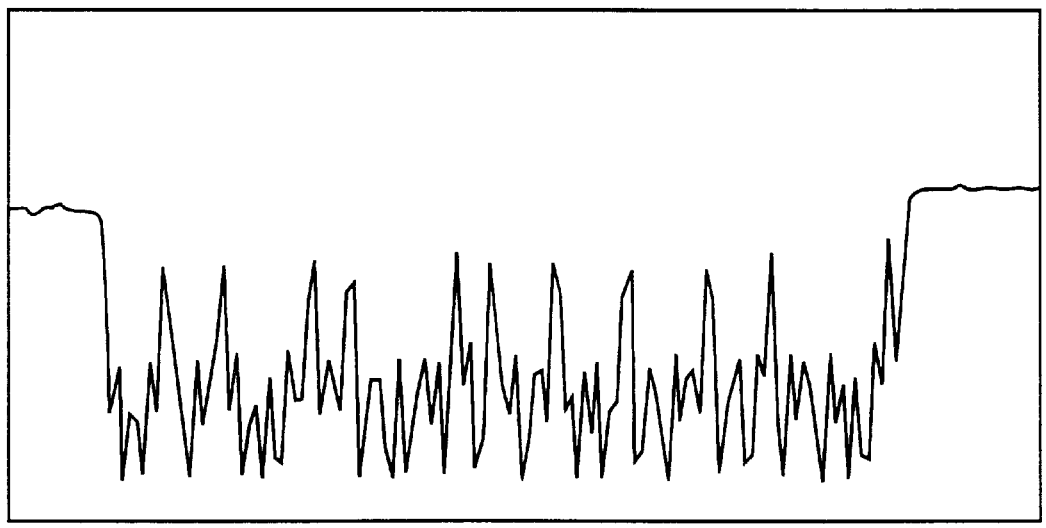

A signal representing a bar code can become blurred in different ways. For example, the blurring can result from the bar code symbol being out-of-focus, or from undersampling which occurs when the bar code symbol is represented in the bar code image by too few pixels to allow conventional decoding. (FIG. 18 illustrates the brightness of a bar code symbol of a bar code image in which undersampling causes some transitions between portions to fail to register fully or at all.) A symbol that is tilted with respect to the image acquisition system, or that is obscured by an intervening factor (e.g., fog inside a freezer) may also lead to a blurred bar code signal. Blurring can also be caused by electronic processing such as filtering involving a limited bandwidth channel or a low pass filter. In general, a signal is blurred if the subject represented by the signal (e.g., a bar code symbol) includes distinct transitions between elements (e.g., edges between dark and light portions) and at least some of the transitions (e.g., transitions that do not meet an amplitude threshold or a frequency threshold) are not accurately represented (e.g., are reduced in amplitude or are skewed or both).

Figure 17:
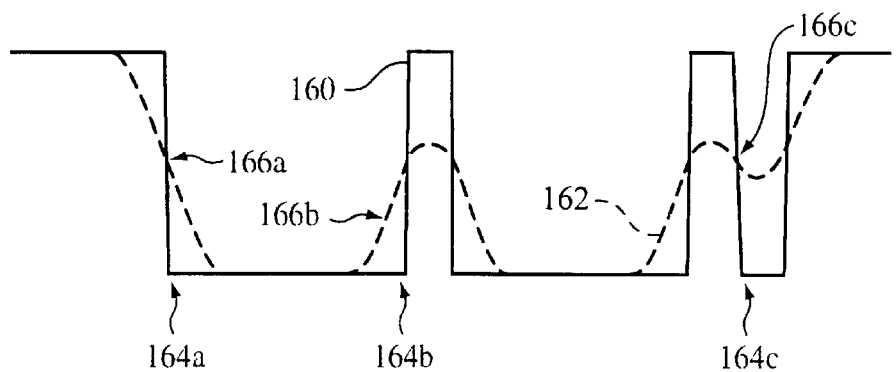

FIG. 17 illustrates some effects of some kinds of blurring, which effects are described in more detail below. Solid and dashed lines 160 and 162 show the brightness of a bar code symbol according to an in-focus image and an out of-focus image, respectively. Transitions 164a and 164c are between similarly-sized portions and therefore deform substantially symmetrically, allowing their positions to be determined by reference to dashed line mid-height points 166a and 166c, respectively. In contrast, since transition 164b is between dissimilarly-sized portions and therefore deforms asymmetrically, dashed line mid-height point 166b is a significantly less accurate indicator of its position.

The characteristics of some blurred signals are illustrated by FIGS. 3A–3E that correspond to progressively more blurred signals. In waveform ("curve") 15a of FIG. 3A, which illustrates the brightness of symbol 14 along line A—A for a minimally blurred image (i.e., for a substantially clear image), transitions between dark and light portions (e.g., between portions 18ac and 18ad, and portions 18ad and 18ae) are represented by substantially vertical lines (e.g., lines 30 and 32, respectively), each of which has a height h1 signifying a change between minimal brightness and maximal brightness. Deriving data accurately from the minimally blurred image is substantially straightforward, because the positions of the transitions can be determined accurately regardless of the brightness threshold (e.g., threshold 34 or threshold 36) applied to distinguish light portions (e.g., portion 18ad) from dark portions (e.g., portion 18ae).

FIG. 3B shows the brightness of symbol 14 along line A—A for a slightly blurred signal. In waveform 15b of FIG. 3B, transitions between dark and light portions (e.g., between portions 18ac and 18ad, and portions 18ad and 18ae) are represented by slightly non-vertical lines (e.g., lines 38 and 40, respectively), each of which has a height substantially equal to height h1. Without the processing described below, deriving data accurately from the slightly blurred image would be difficult, because the brightness threshold applied (e.g., threshold 34 or threshold 36) has a significant effect on the determination of the positions of the transitions. For example, depending on whether threshold 34 or threshold 36 is applied, the position of the transition represented by line 41 may be determined to be position 42 or position 44, respectively. In particular, a brightness threshold that leads to an accurate derivation of data from the minimally blurred image may lead to an inaccurate derivation of data from the slightly blurred image.

Figure 3C:
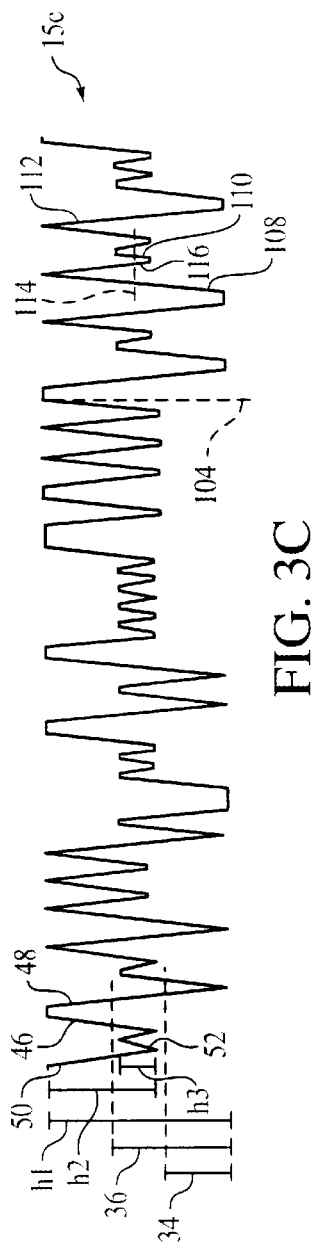

FIG. 3C illustrates the brightness of symbol 14 along line A—A for a moderately blurred signal. In waveform 15c of FIG. 3C, the transitions between dark and light portions (e.g., between portions 18ac and 18ad, and portions 18ad and 18ae) are represented by lines (e.g., lines 46 and 48, respectively) that are even less vertical than corresponding lines of FIG. 3B. In addition, some of the lines have heights that are significantly less than height h1. For example, lines 50 and 52 have heights h2 and h3, respectively, which heights signify changes in brightness between minimal (or maximal) brightness and a gray level, and between two gray levels, respectively. As explained below, the heights h1, h2, and h3 conform to the equation h1−h2=h2−h3. Without the processing described below, deriving data accurately from the moderately blurred image would be very difficult, because some transitions may be missed entirely, depending on the brightness threshold applied (e.g., the transition represented by line 52 is missed entirely if threshold 34 or threshold 36 is applied).

Figure 3D:
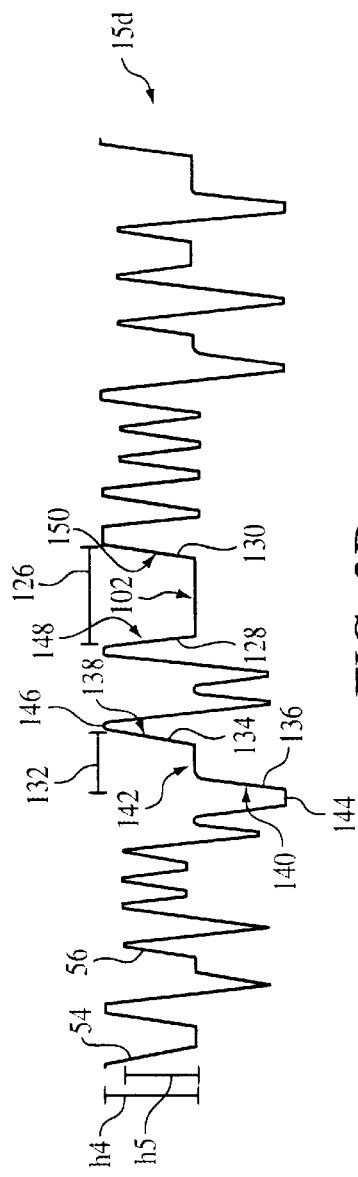
Figure 3E:
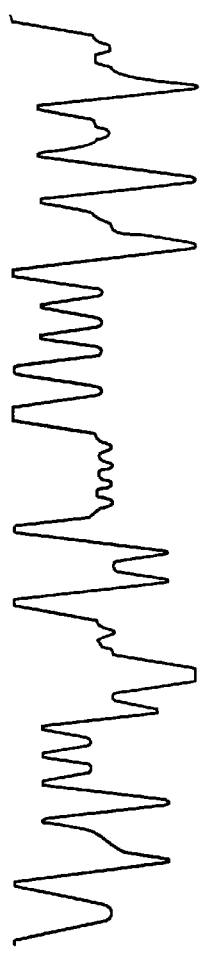

FIG. 3D shows the brightness of symbol 14 along line A—A for a severely blurred signal. In waveform 15d of FIG. 3D, transitions between some dark and light portions are represented by lines of height h4 (e.g., line 54) or height h5 (e.g., line 56). In the severely blurred image, transitions between other, narrower, portions (e.g., portions 18ab and 18ac) are so blurred that such transitions are not represented in FIG. 3D by lines of any significant height.

Figure 4:
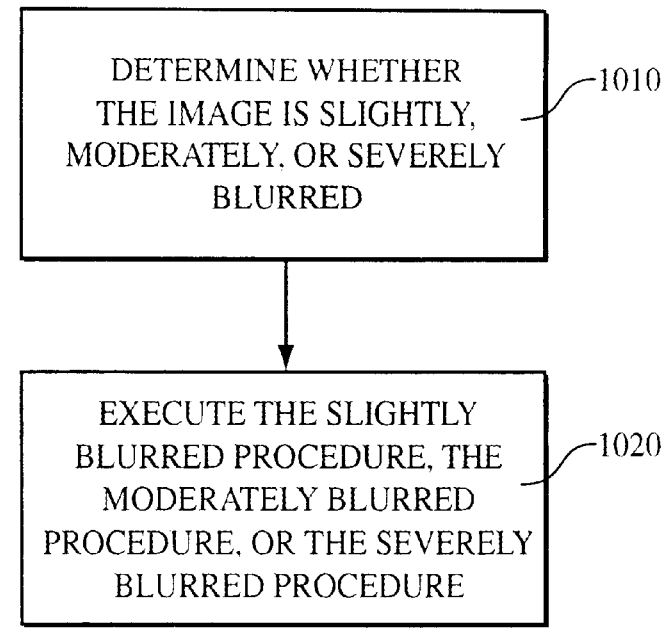
FIGS. 4–5, 9–14 are flow diagrams of procedures for analyzing a bar code symbol.
Figure 9:
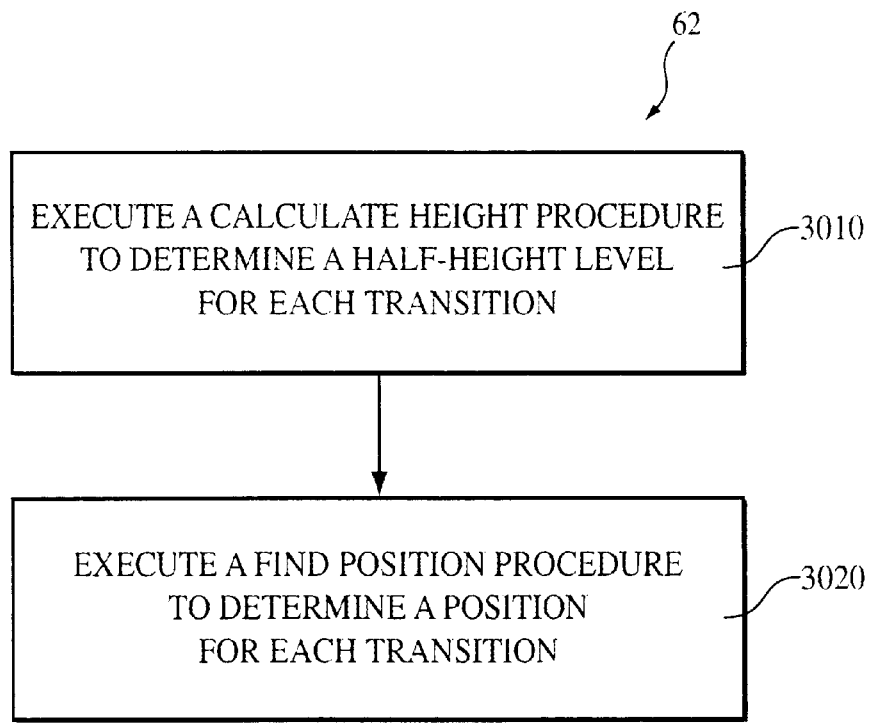
Figure 12:
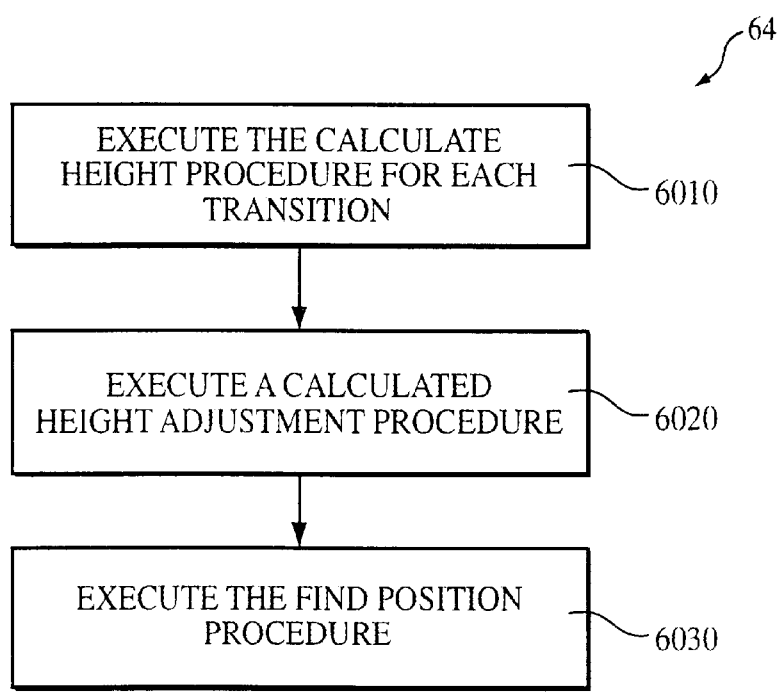
Figure 14:
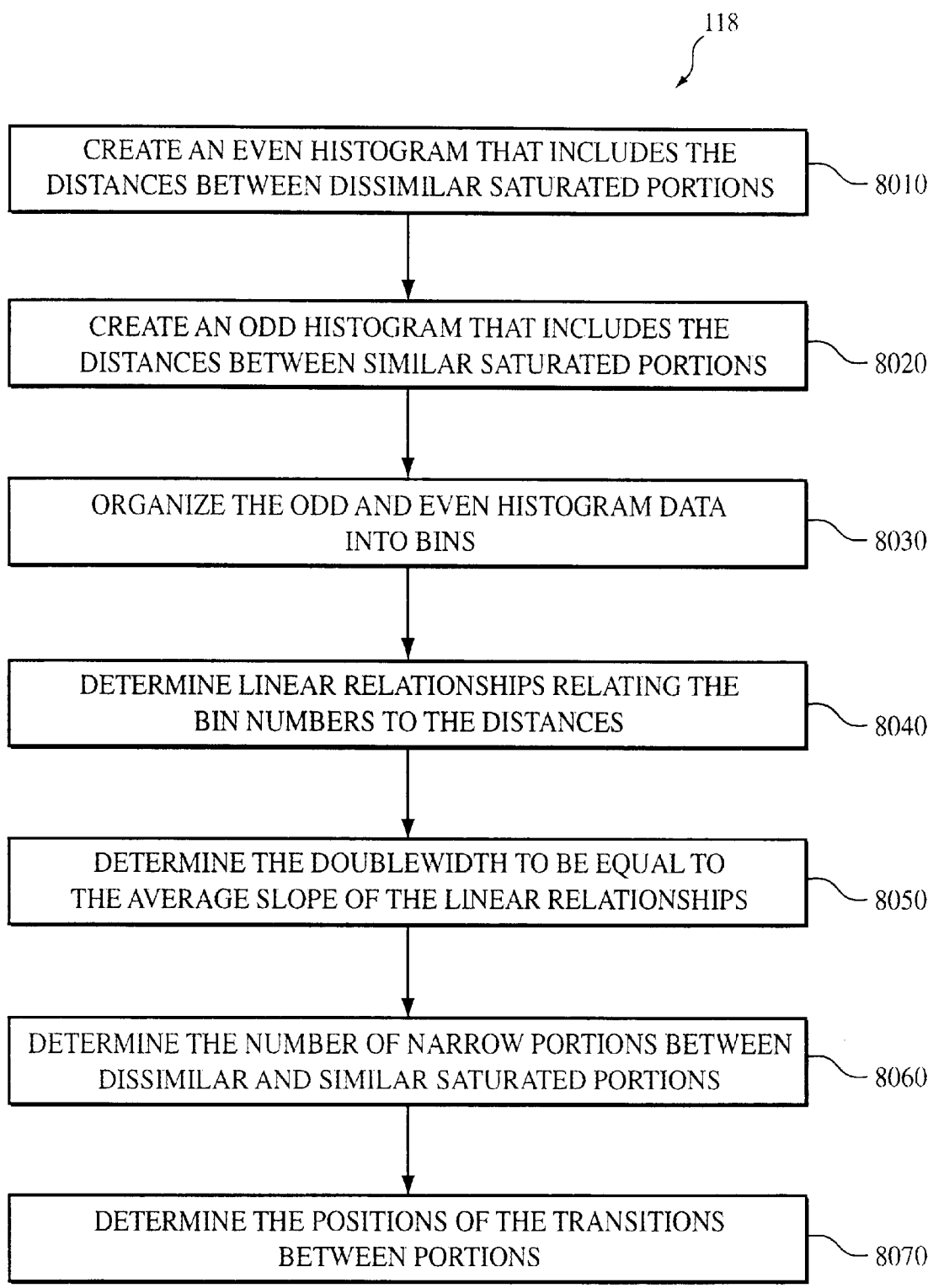

As shown in FIG. 4, to determine the set of positions, the image analysis system first executes a procedure 60 (FIG. 5) to determine whether the image is slightly, moderately, or severely blurred (step 1010), and then executes a procedure 62 (FIG. 9), a procedure 64 (FIG. 12), or a procedure 118 (FIG. 14), respectively, to determine the set of positions (step 1020).

Figure 5:
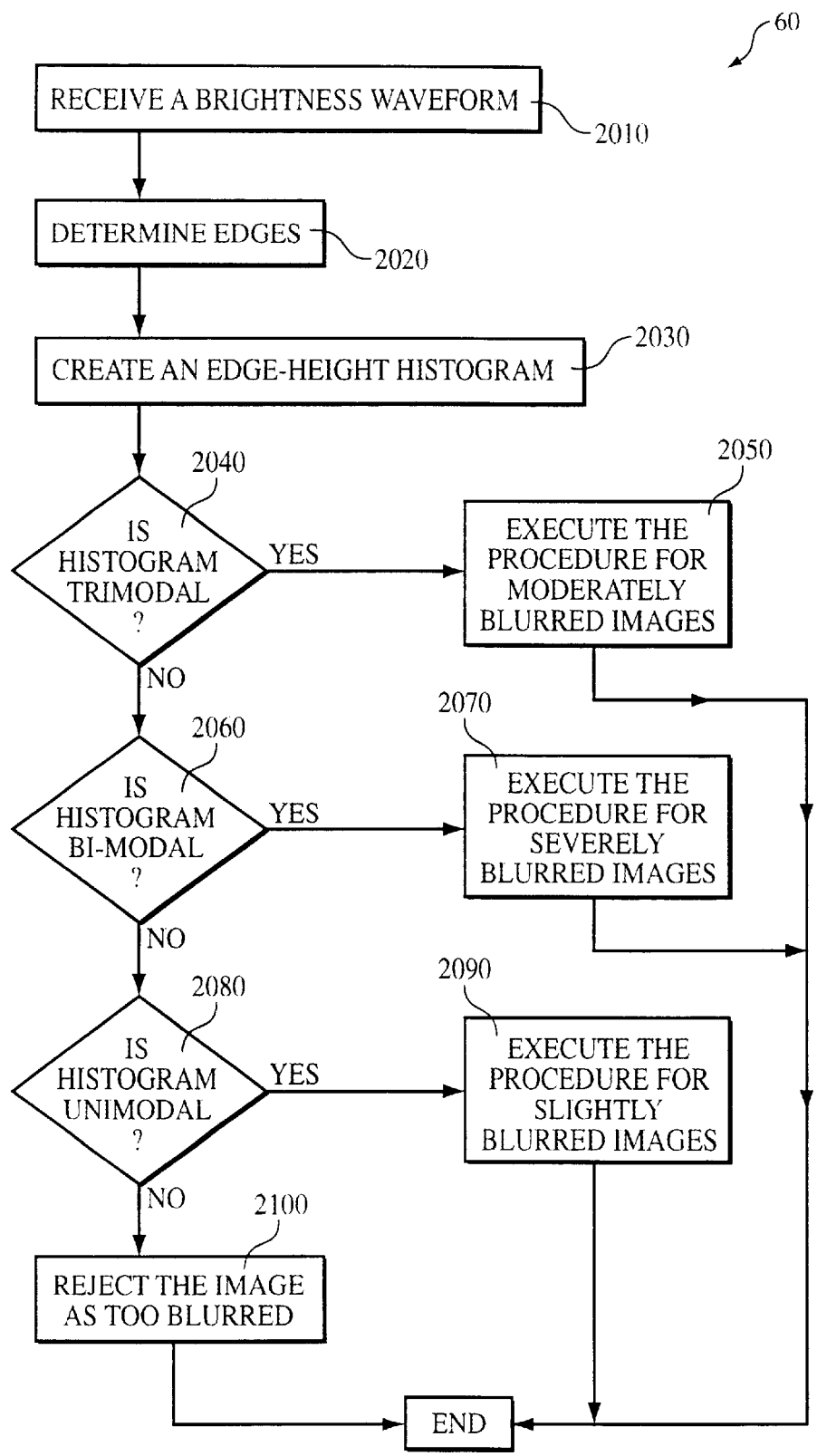

FIG. 5 illustrates procedure 60 for determining whether the signal is slightly, moderately, or severely blurred. Procedure 60 relies on some of the characteristics described above, i.e., that slightly blurred signals produce essentially one magnitude of transitions (represented by height h1 noted above), that moderately blurred signals produce essentially three magnitudes of transitions (represented by heights h1, h2, and h3 noted above), and that severely blurred signals produce essentially two magnitudes of transitions (represented by heights h4 and h5 noted above).

Figure 6:
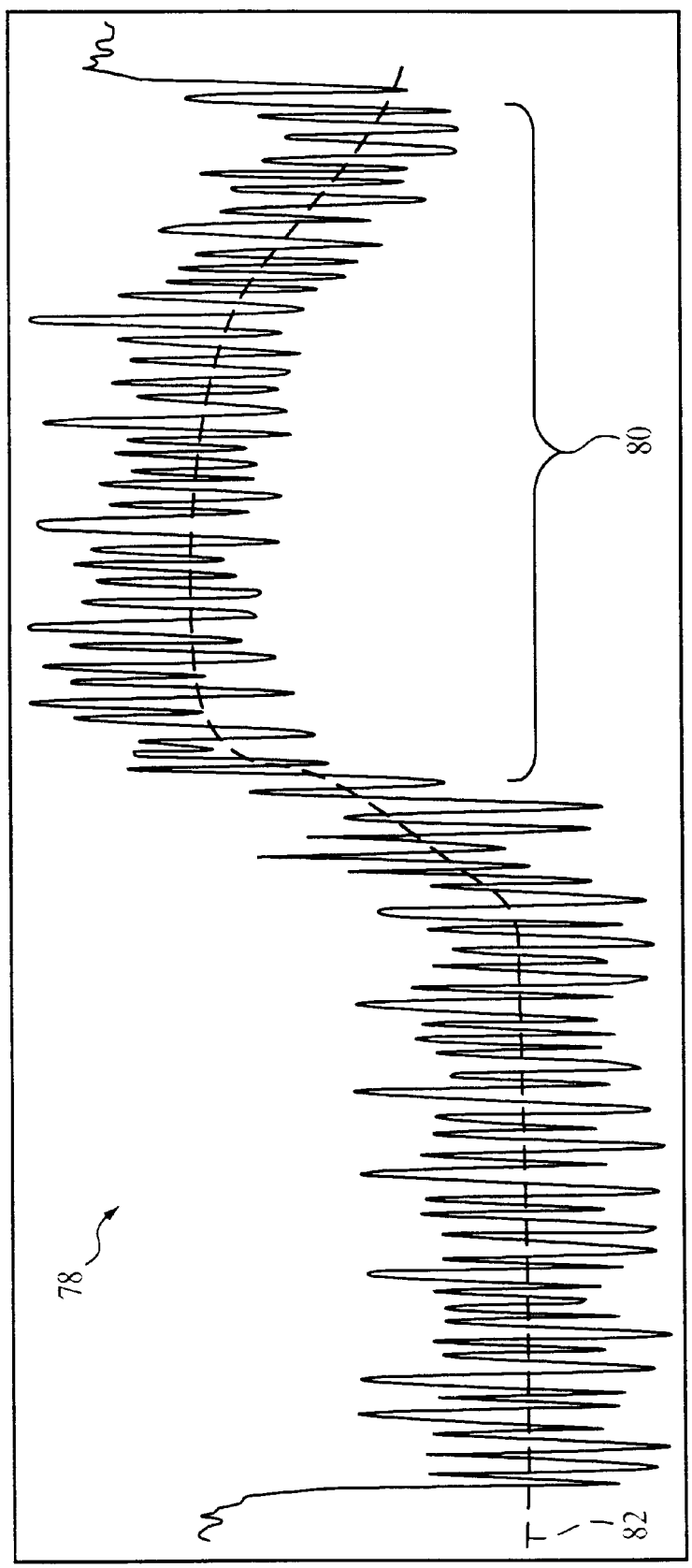
FIGS. 6, 8, and 18–19 are illustrations of waveforms derived from a bar code symbol.

According to procedure 60, the image analysis system receives data representing a brightness waveform (e.g., waveform 15b of FIG. 3B) derived from a blurred signal (step 2010). In the waveform, the system determines lines (also known as "edges") (e.g., edges 70, 72 in FIG. 3B) by finding portions between local minimums and local maximums (e.g, local minimum 74 and local maximum 76 for edge 70) (step 2020). The height of each edge is a relative height equal to the difference between the vertical positions of the local maximum and minimum. The use of the relative height allows the system to significantly avoid the influence of low-frequency noise, i.e., noise having a lower spatial frequency than the spatial frequencies present in the bar code symbol. For example, FIG. 6 shows brightness waveform 78 having a second half 80 that is buoyed on a crest of a period of a low-frequency noise signal 82. The use of relative height instead of absolute height effectively filters out the crest.

The system creates data representing an edge-height histogram (e.g., histogram 84a, 84b, or 84c shown in FIG. 7A, 7B, or 7C, respectively) (step 2030). In the histogram, the x-axis indicates height as a fraction of the maximum possible height (corresponding to the maximum possible brightness), and the y-axis indicates a number of edges. For example, in histogram 84c, point 86 indicates that 10 edges of the brightness waveform have a height 0.65.

To filter out high-frequency noise that appears as relatively small edges in the brightness curve, a height threshold (e.g., set to a level in the range of one-eighth to one-quarter the maximum possible height) may be applied to the histogram. If the height threshold is set to a high level, a histogram that would otherwise be processed as a tri-modal histogram (described below) may be treated as a bi-modal histogram (described below) instead, because at the high level the height threshold may eliminate some edges that represent actual transitions of the image, not noise.

The system determines whether the histogram is a tri-modal histogram (step 2040). To do so, the system attempts to find spaces (i.e., x-axis positions that correspond to none of the edges) in the histogram that divide the histogram data into three equal-sized sections (e.g., sections 88a, 88b, and 88c in FIG. 7C), and, if successful, then tests whether the data in the sections substantially conforms to the equation h1−h2=h2−h3 that is mentioned above and that is illustrated in FIG. 8. An edge of height h1 represents a transition between a wide ("saturated") light portion and a saturated dark portion (e.g., between portions 18br and 18bs of FIG. 2). An edge of height h2 represents a transition between a saturated light portion and a narrow ("unsaturated") dark portion (e.g., between portions 18bj and 18bk of FIG. 2), or between a saturated dark portion and an unsaturated light portion (e.g., between portions 18aq and 18ar of FIG. 2). An edge of height h3 represents a transition between an unsaturated light portion and an unsaturated dark portion (e.g., between portions 18ba and 18bb of FIG. 2).

Figure 7A:
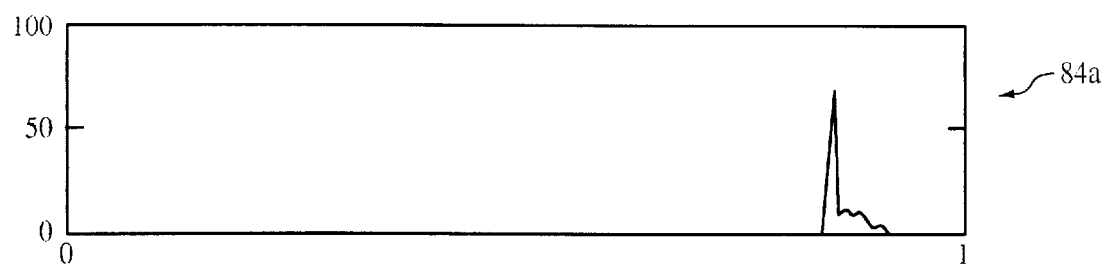
FIGS. 7A–7C, 15 are diagrams of histograms derived from a bar code symbol.
Figure 7B:
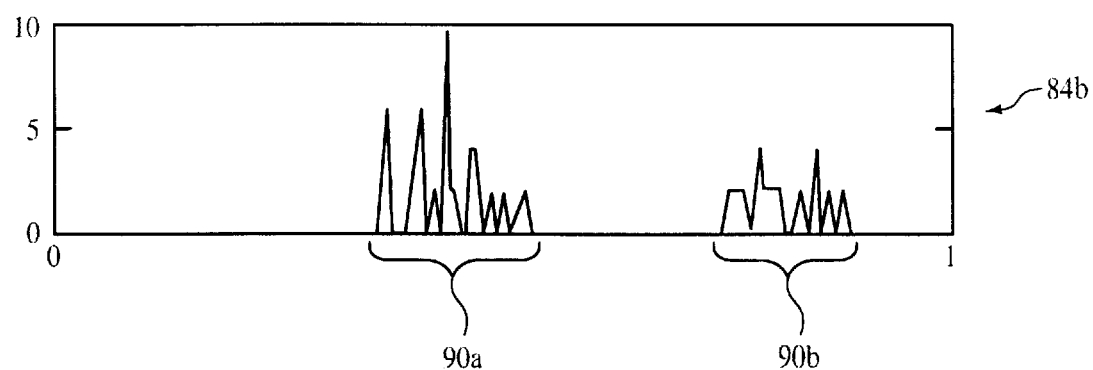
Figure 7C:
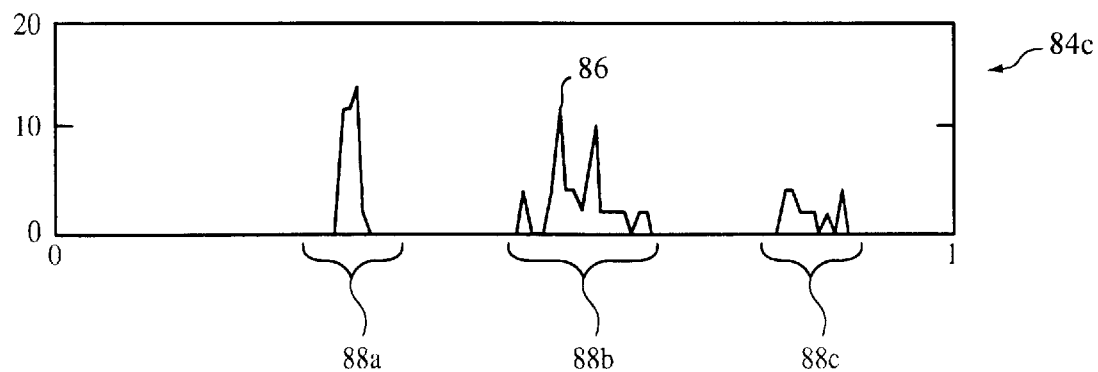
Figure 8:
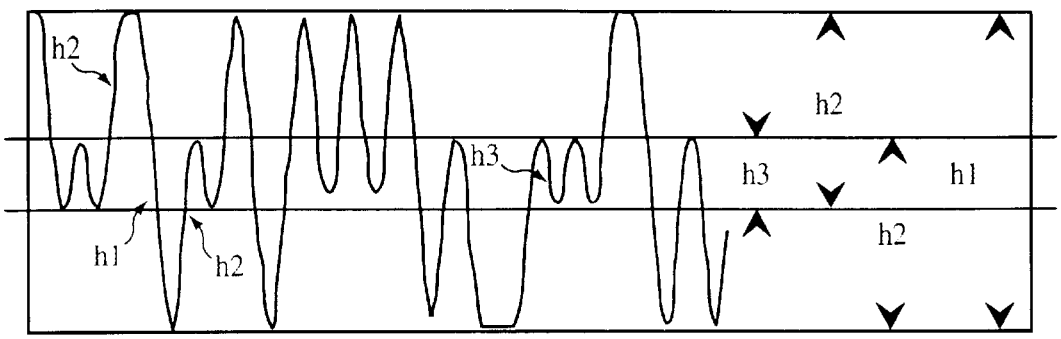

Before testing whether the data in the sections substantially conforms to the equation h1−h2=h2−h3, the system may reduce the data in each section to a respective weighted average, and test the weighted averages instead. Histogram 84c of FIG. 7C is an example of a histogram that has data substantially conforming to the equation, and that therefore is a tri-modal histogram.

If the system determines that the histogram is a tri-modal histogram, the image is determined to be a moderately blurred image, and the image's brightness curve is processed according to procedure 64 (FIG. 12) described below (step 2050).

Otherwise, the system determines whether the histogram is a bi-modal histogram (step 2060). To do so, the system attempts to find a space in the histogram that divides the histogram data into two equal-sized sections (e.g., sections 90*a* and 90*b* in FIG. 7B), and, if successful, determines whether the difference between weighted averages of the data in the two sections is at least as great as the difference between the smaller of the weighted averages (i.e., the weighted average for the left section in the histogram) and the height threshold described above. Such differences are present in histogram 84*b* of FIG. 7B, which is an example of a histogram that qualifies as a bi-modal histogram.

If the system determines that the histogram is a bi-modal histogram, the image is determined to be a severely blurred image, and the image's brightness curve is processed according to procedure 118 (FIG. 14) described below (step 2070).

Otherwise, the system determines whether the histogram is a uni-modal histogram (step 2080), in which substantially all of the edges have the same height h1. Histogram 84*a* of FIG. 7A is an example of a histogram that qualifies as a uni-modal histogram.

If the system determines that the histogram is a uni-modal histogram, the image is determined to be a slightly blurred image, and the image's brightness curve is processed according to procedure 62 (FIG. 9) described below (step 2090).

Otherwise, the system rejects the image (step 2100).

If the image is more than slightly blurred but less than moderately blurred, producing a histogram that is not uni-modal but also not fully tri-modal, either procedure 62 (FIG. 9) or procedure 64 (FIG. 12) may be used to process the image's brightness curve. If the image is more than moderately blurred but less than severely blurred, producing a histogram in which one of three sections is near or below the height threshold, procedure 118 (FIG. 14) may be used to process the image's brightness curve.

In procedure 62 (FIG. 9) for processing slightly blurred images, the position of each transition (e.g., between portions 18*bw* and 18*bx* in FIG. 2) in the bar code symbol is determined to be the position (e.g., position 92 in FIG. 3B) defined by a level (e.g., level 94) at which the corresponding edge (e.g., edge 96) reaches half its relative height, i.e., a half-height level. The half-height level is used because in a slightly blurred image, the edge shape is assumed to be deformed symmetrically. In particular, the system executes a calculate height procedure 98 (FIG. 10) described below to determine a calculated height level (in this case, a half-height level) for each transition (step 3010), and then executes a find position procedure 100 (FIG. 11) described below to determine a position for each transition (step 3020).

The system executes the calculate height procedure 98 (FIG. 10) as follows to produce calculated height levels. In view of the fact that the bar code symbol includes alternating light and dark portions, it is assumed that the portions of the bar code symbol conform to the following 2 rules implementing a state machine: (1) any transition from a saturated or unsaturated light portion must be to a saturated or unsaturated dark portion, and (2) any transition from a saturated or unsaturated dark portion must be to a saturated or unsaturated light portion. Before the first (i.e., leftmost) edge is encountered in the brightness curve, the current portion is assumed to be a saturated light portion (step 4010). It is determined whether the next edge height is greater than the height threshold (step 4020). If not, step 4020 is repeated for the next edge.

Otherwise, it is determined whether the edge height and direction are consistent with the state machine rules (step 4030). For example, if the current portion is a saturated or unsaturated dark portion, an edge direction representing a decline in brightness would be inconsistent with the state machine rules. If inconsistency is found, the image is rejected (step 4040).

Otherwise, the state machine position of the current portion is noted (step 4050), and a calculated height level is produced by taking the average of vertical positions of the local minimum and maximum that define the edge, i.e., by selecting the half-height level of the edge (step 4060). Steps 4020–4060 are then repeated for all remaining edges in the brightness waveform (step 4070).

The system executes the find position procedure 100 (FIG. 11) as follows to produce positions for each edge. Steps 5010–5030 are executed for each edge. The system determines whether the edge crosses the calculated height level only once (step 5010). If not, the image is rejected (step 5020), because a repeated crossing signifies that the edge has a horizontal component (e.g., component 102 of FIG. 3D), indicating that the image is actually severely blurred (despite having been determined by procedure 60 above to be only slightly blurred), so that some transitions in the bar code symbol are not represented by edges in the brightness curve.

Otherwise, the system records in set 16 the position at which the edge crosses the calculated height level (step 5030), which position is taken to be the determined position of the transition represented by the edge.

Figure 13:
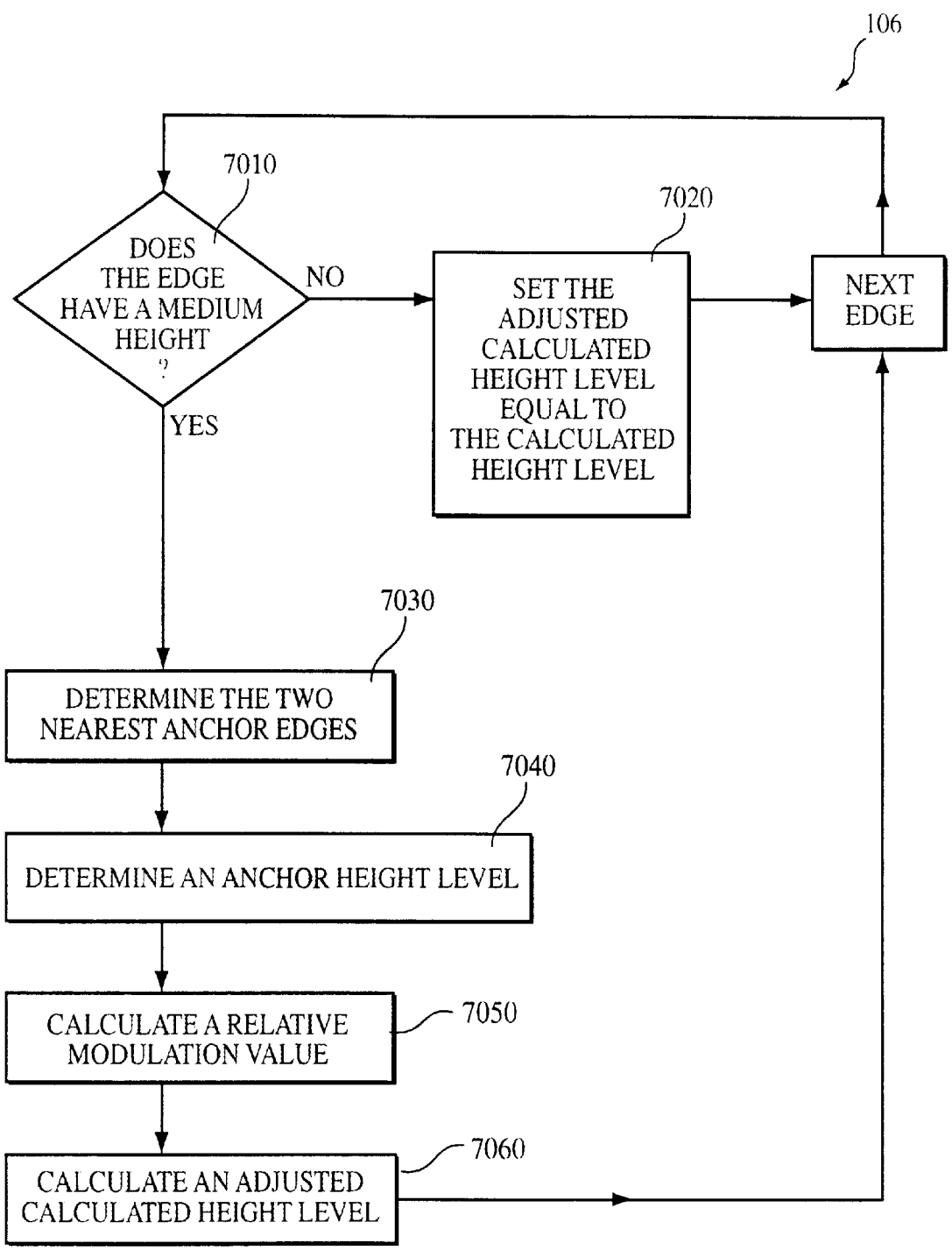

In procedure 64 (FIG. 12) for processing moderately blurred images, the position of each transition (e.g., between portions 18*bq* and 18*br* in FIG. 2) in the bar code symbol is determined to be the position (e.g., position 104 in FIG. 3C) defined by an adjusted calculated height level. As explained below, the half-height level discussed above is not used for edges having height h2 corresponding to the middle section of the histogram (e.g., section 88*b* of FIG. 7C) ("medium height edges") because such medium height edges represent transitions between saturated and unsaturated portions (e.g., portions 18*bs* and 18*bt* in FIG. 2), which transitions do not deform symmetrically. In particular, the system executes the calculate height procedure 98 (FIG. 10) described above to determine a calculated height level (i.e., a half-height level) for each transition (step 6010), executes a calculated height adjustment procedure 106 (FIG. 13) to produce adjusted calculated height levels from the calculated height levels (step 6020), and then executes the find position procedure 100 (FIG. 11) described above to determine a position for each transition (step 6030). Thus, he intermediate adjustment step (step 6020) is only difference between procedure 62 and procedure 64, except hat procedure 64 calls for the find position procedure 100 (FIG. 11) to use the adjusted calculated height levels.

Figure 10:
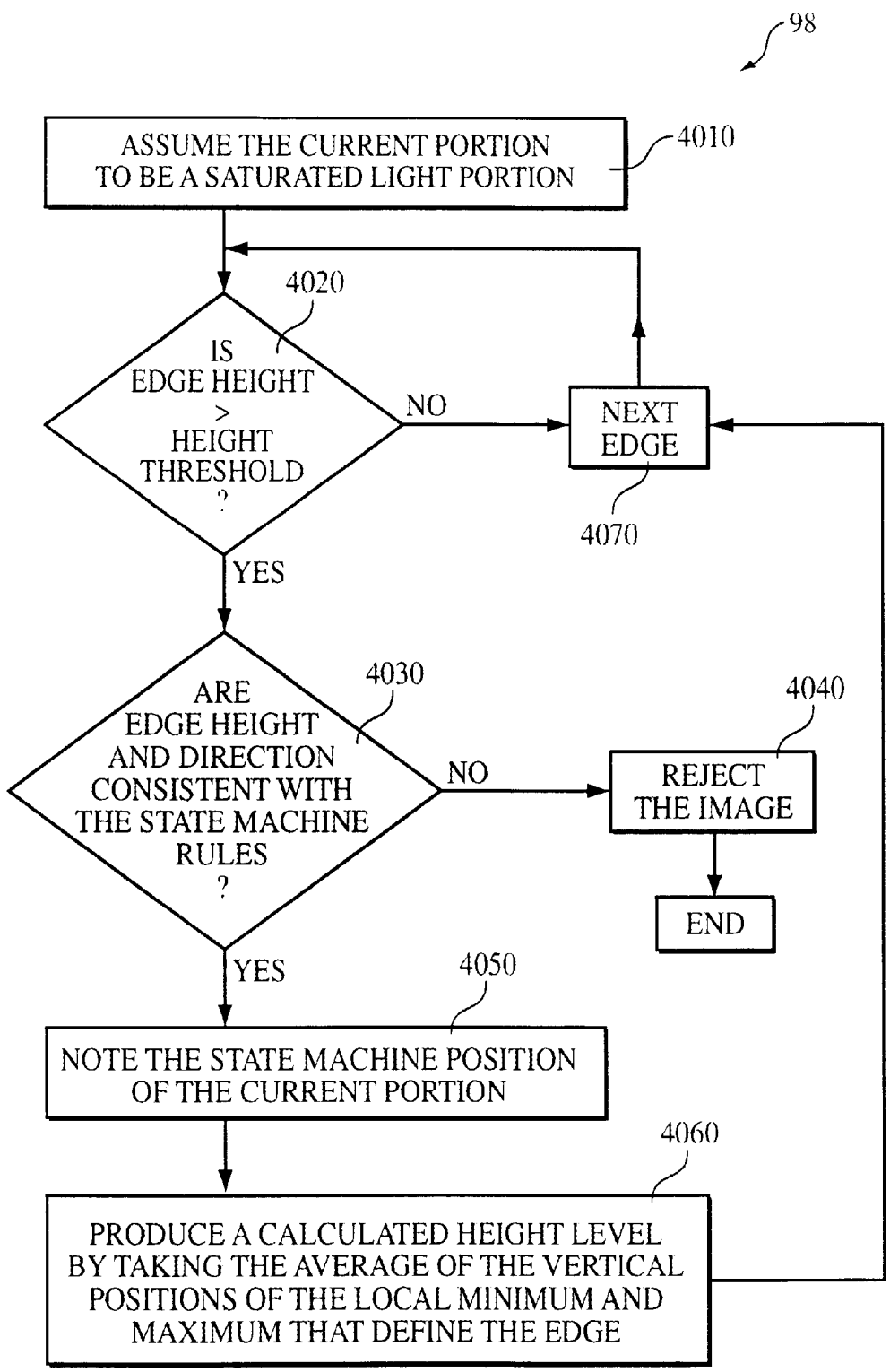
Figure 11:
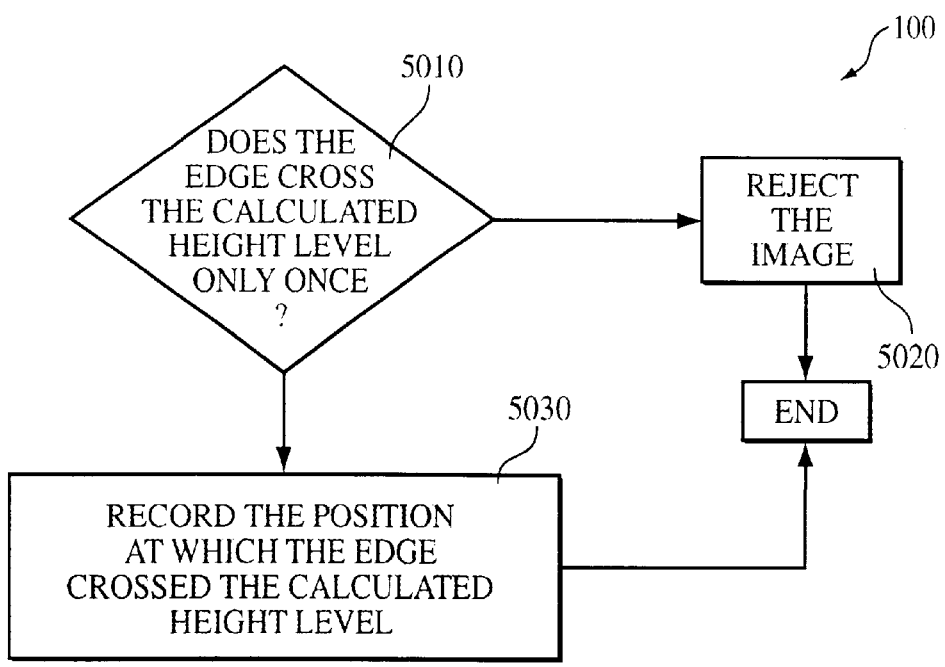

The system executes the calculated height adjustment procedure 106 (FIG. 13) as follows to produce the adjusted calculated height levels from the calculated height levels, i.e., to apply adjustments to the half-height levels for edges having medium heights. Steps 7010–7060 are executed for each edge. The system determines whether the edge has a medium height (step 7010). If not, the system sets the adjusted calculated height level equal to the calculated height level (step 7020), and goes on to the next edge. The adjusted calculated height levels for the edges having non-medium heights are simply the half-height levels determined as discussed above in the description of the calculate height procedure 98 (FIG. 10). For such edges (called "anchor edges" for purposes described below), no adjustment is necessary, because such edges represent symmetrical transitions, i.e., transitions between saturated light and saturated dark portions (e.g., portions 18$br$ and 18$bs$ in FIG. 2), or between unsaturated dark and unsaturated light portions (e.g., portions 18$ba$ and 18$bb$ in FIG. 2). Such symmetrical transitions deform symmetrically, allowing the use of the half-height levels.

If the edge has a medium height, the system determines the two nearest anchor edges (e.g., in FIG. 3C, anchor edges 108 and 110 for medium-height edge 112) (step 7030). Using the half-height levels previously determined for the two nearest anchor edges, the system determines an anchor height level for the medium-height edge (step 7040). The anchor height level is determined by interpolation if the medium-height edge is between the two anchor edges, or by extrapolation if not. For example, for anchor edges 108 and 110 and medium-height edge 112 in FIG. 3C, anchor height level 116 is determined where dashed line 114 intersects medium-height edge 112.

The system also calculates a relative modulation value for the medium-height edge (step 7050). The medium-height edge represents an asymmetrical transition, i.e., a transition between an unsaturated portion and a saturated portion (e.g., in FIG. 2, between portions 18$ap$ and 18$aq$ or between portions 18$bu$ and 18$bv$). The relative modulation value is calculated by dividing the relative height of the medium-height edge by double the relative height of an edge representing a transition between saturated portions, i.e., by calculating $h2/(2 * h1)$, and is indicative of the extent to which the saturated portion dominates the unsaturated portion in the transition represented by the medium-height edge.

An adjusted calculated height level is calculated for the medium-height edge (step 7060), by taking a weighted average of the medium-height edge's half-height level and the anchor height level. The weighted average is taken by multiplying the anchor height level by the relative modulation value to produce a weighted anchor height level, multiplying the half-height level by the difference of 2 less the relative modulation value to produce a weighted half-height level, summing the weighted anchor height level and the weighted half-height level, and dividing the sum by 2.

The adjusted calculated height level is then ready for use by the find position procedure 100 (FIG. 11) as described above.

In procedure 118 (FIG. 14) for processing severely blurred images, the position of each transition is determined in a way that is significantly different from the procedures described above for processing slightly or moderately blurred images. Since in this case only saturated portions (e.g., portions 18$aq$ and 18$av$ in FIG. 2) of the bar code symbol are reliably represented in the brightness curve, the positions of the transitions involving the other, narrower, portions are estimated by determining the number of such other portions present in between the saturated portions. Specifically, it is assumed that each narrow portion has substantially the same width, so that a matched pair of narrow portions, i.e., one dark narrow portion plus one light narrow portion, has a width equal to twice the width of a single narrow portion (a "doublewidth"). Procedure 118 relies on the fact that due to the dark-and-light alternating nature of bar code symbols, each saturated portion (e.g., dark saturated portion 18$aq$ in FIG. 2) is separated from its nearest neighboring saturated portion (e.g., white saturated portion 18$av$ or dark saturated portion 18$ao$) by a number of narrow portions that is odd or even, depending on whether the nearest neighboring saturated portion is similar or dissimilar, respectively. As described below, procedure 118 exploits this odd/even difference to estimate the doublewidth, which allows the procedure 118 to determine the positions of the transitions involving the narrow portions.

The system executes procedure 118 (FIG. 14) as follows. The system creates an even histogram that includes the distances between dissimilar saturated portions (step 8010), and an odd histogram that includes the distances between similar saturated portions (step 8020). For example, from data for curve 15$d$ shown in FIG. 3D, the system produces histogram 120 of FIG. 15, in which solid and dashed lines (e.g., solid line 122 and dashed line 124) represent data for the even and odd histograms, respectively. In FIG. 3D, an example of a distance between similar saturated portions is distance 126 between edges 128 and 130 that correspond to light saturated portions 18$az$ and 18$bj$, respectively, in FIG. 2. An example of a distance between dissimilar saturated portions is distance 132 between lines 134 and 136 that correspond to light portion 18$av$ and dark portion 18$aq$, respectively, in FIG. 2.

In at least some cases, it may be advantageous to determine the distance between dissimilar saturated portions by measuring between 25% and 75% points (e.g., between points 138 and 140) of the associated edge or edges. The use of such points may make the distance measurements less susceptible to errors caused by a substantially flat gray level area (e.g., area 142) at a 50% point or high-frequency noise at peak and valley areas (e.g., areas 146 and 144).

Similarly, in at least some cases, it may be advantageous to determine the distance between similar saturated portions by measuring between respective 50% points (e.g., points 148 and 150).

Figure 15:
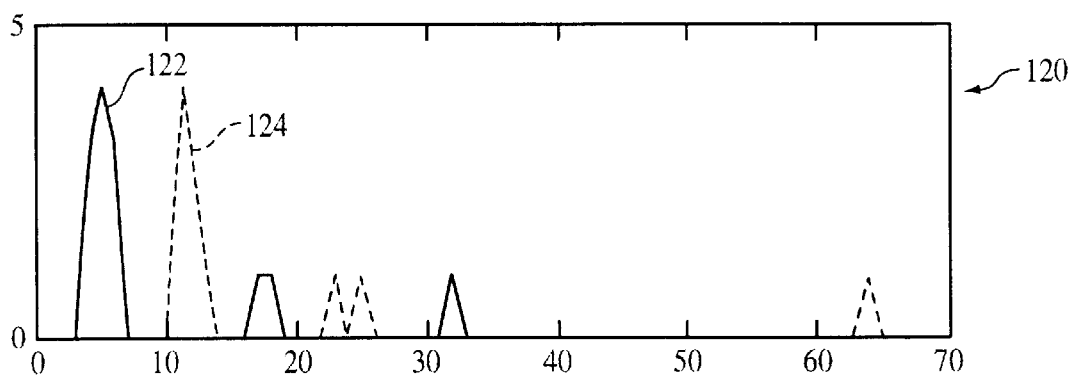

As shown in FIG. 15, in the even and odd histograms, the horizontal axis indicates distance (which may be scaled by a factor) and the vertical axis indicates the number of instances found of each distance.

The system organizes the odd and even histogram data points into clusters, i.e., groups wherein each group represents a particular number of doublewidths (step 8030). The system may proceed as now described in an example. The system selects the data points from the histogram that has the largest span (e.g., the odd histogram in FIG. 15). If it is known that the maximum number of consecutive narrow portions is 13, it is assumed that such data points may represent up to only six clusters. To determine which number between 1 and 6 is the proper number of clusters, each number is tested, as follows. The span selected (e.g., span 0 to 65 in FIG. 15) is divided into equal-sized sections according to the number under test. For each data point found in each section, the system determines a difference dx between the location of the data point and the center of the section. After the system determines a standard deviation for dx which represents the extent to which the data points are spread out, on average, in each section, the standard deviation is divided by the section size to produce a score. The number under test that produces the lowest score is selected by the system as the correct number of clusters. The system may similarly test the data points from the other histogram to confirm that the correct number was selected.

Figure 16:
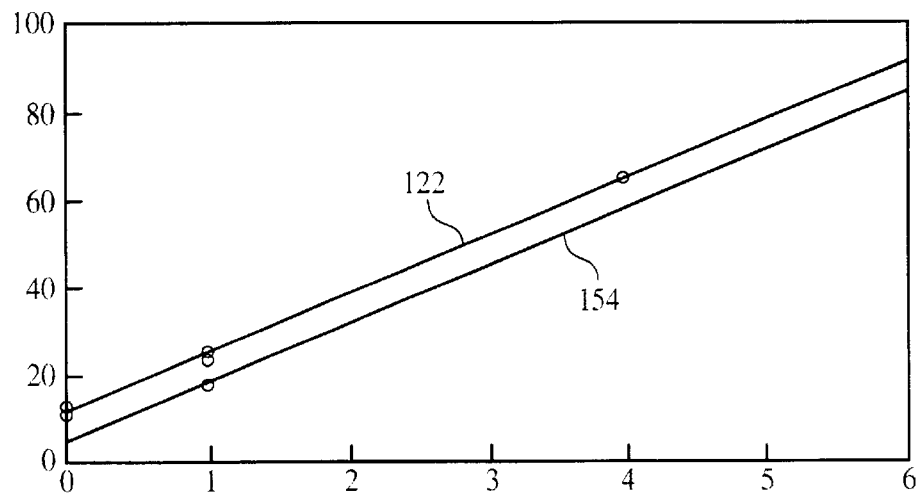
FIGS. 16 and 20 are diagrams of linear relationships derived from a bar code symbol.

The system determines linear relationships (e.g., lines 152 and 154 of FIG. 16) that relate the cluster numbers to the distances represented by the data points (step 8040). The doublewidth is determined to be equal to the average of the slopes of the linear relationships (step 8050). The slopes may be calculated by a method of joint linear regression with common slope, using least-squares.

Armed with the determined doublewidth, the system then determines the number of narrow portions between dissimilar and similar saturated portions (step 8060). For each distance between dissimilar saturated portions, the number is equal to twice the number of doublewidths that fit in the distance. For each distance between similar saturated portions, the number is equal to the number of doublewidths that fit in the distance, plus one.

Since the saturated portions are explicitly represented in the brightness curve, the system can determine the positions of the transitions between all of the bar code symbol's portions by dividing up the distances between the saturated portions according to the determined number of narrow portions between the saturated portions (step 8070).

In another embodiment, the system operates with the following differences. To determine whether the image is slightly, moderately, or severely blurred, the system relies on an edge-by-edge peak-valley analysis in which each edge is classified in turn by its height relative to the height of a previously classified adjacent edge. Thus, edges are analyzed in successive, overlapping pairs. In each pair, the relative heights are expressed as a ratio of the lesser of the two heights to the greater of the two heights. To avoid false edges resulting from high-frequency noise, if the ratio is less than a predetermined fraction (e.g., one-quarter), the smaller edge is ignored, i.e., is considered a part of a different, larger edge.

Each edge is classified into one of three height classes: for transitions between saturated light and saturated dark ("class 1"), between unsaturated light or dark and saturated dark or light ("class 2"), or between unsaturated light and unsaturated dark ("class 3"). The class of the previously classified adjacent edge determines the set of possible classes for the edge currently being classified. If the previously classified adjacent edge belongs to class 1 which requires that the portion between the edges in the pair be a saturated portion, the current edge may belong to class 1 or class 2 but not class 3.

Where the previously classified adjacent edge belongs to class 2 or 3, the set of possible classes includes classes 1–3 or classes 2–3, respectively.

If the ratio is greater than another predetermined fraction (e.g., three-quarters), the current edge is determined to belong to the same height class as the previously classified adjacent edge. Otherwise, the current edge is classified into one of the other classes in the set of possible classes, i.e., into class 1 or 3 (the current edge corresponding to the greater or the lesser, respectively, of the two heights in the ratio) if the previously classified adjacent edge belongs to class 2, or into class 2 if not.

Figure 19:
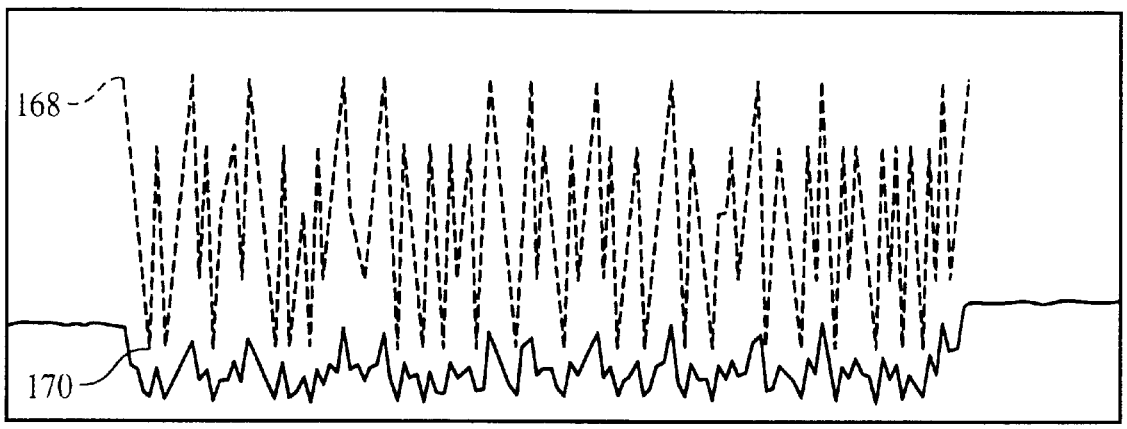

After the edges have been classified, the system determines peak and valley points such as points 168 and 170 (FIG. 19) for the whole brightness waveform. In accordance with the classification of the edges, each of these points corresponds to saturated light, saturated dark, unsaturated light, unsaturated dark, or gray.

If the image includes points corresponding to gray, the image is determined to be severely blurred. Otherwise, the image is determined to be moderately blurred if points corresponding to unsaturated dark or light are found, or slightly blurred if not.

Slightly blurred images are processed as described above. The processing of moderately blurred images differs from the processing described above in that the edges are analyzed in groups, wherein each group is delimited by a saturated peak point and a saturated valley point, and the average of the delimiting points serves as the anchor height level for each edge in the group.

In the processing of severely blurred images, the distances between the saturated portions are determined not by reference to the 25%, 50%, or 75% levels described above but by reference to calculated reference levels instead. Each calculated reference level is calculated by taking the average of the corresponding peak or valley point and a local average gray level derived by averaging all of the peak and valley points between the saturated portions.

Figure 20:
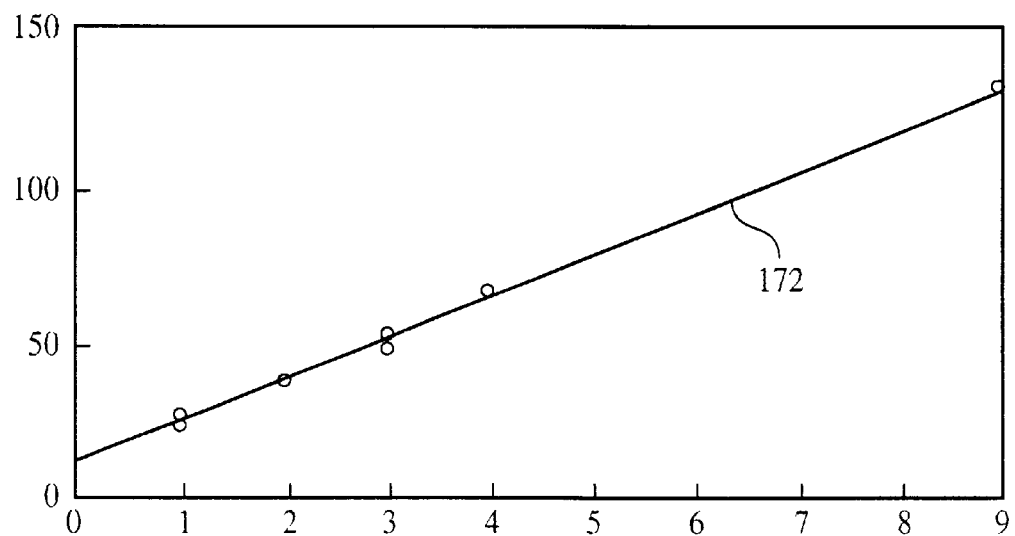

The width of a narrow portion ("singlewidth") is determined instead of the doublewidth, by using both odd and even histogram data to determine a single linear relationship (e.g., line 172 of FIG. 20). Parity between odd and even histogram data is preserved by aligning a data point from the odd histogram data with an odd horizontal point even if the data point is closer to an even horizontal point.

In at least some cases that may involve significant noise, undersampling, non-uniform illumination, or a failure to find any edge of height h1, this other embodiment can determine the positions where the first-described embodiment cannot.

Figure 21:
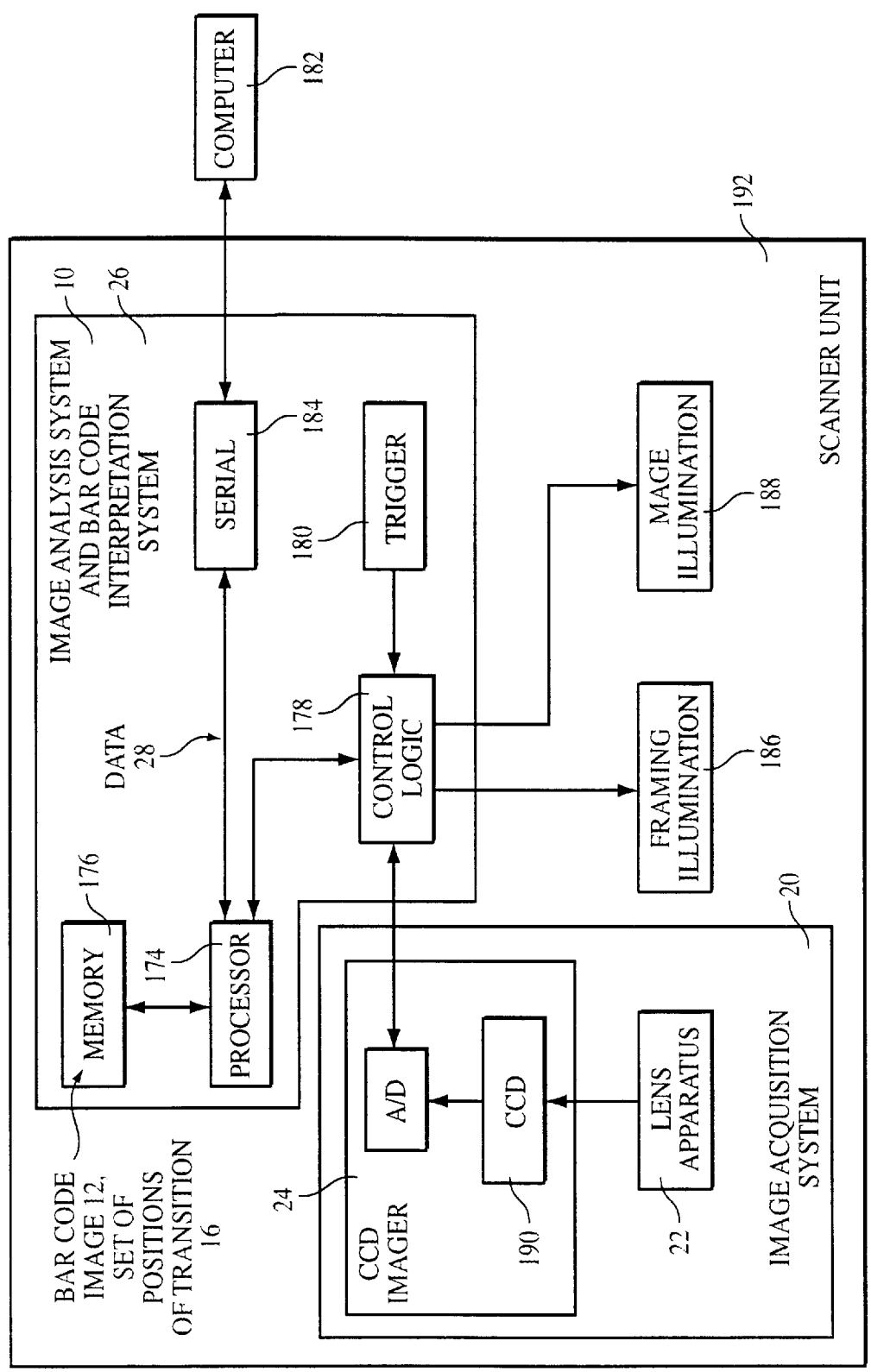
FIG. 21 is a block diagram of an example of an implementation of the image analysis system of FIG. 1.

FIG. 21 illustrates an example of a scanner system based on the invention. The image analysis system 10 and bar code interpretation system 26 are implemented by a processor circuit 174 (e.g., a PowerPC processor) communicating with control logic 178 (e.g., an ASIC) responsive to a trigger circuit 180 (e.g., a switch) to store in a memory circuit 176 (e.g., a flash memory) the bar code image 12 (e.g., a 8-bit 624×480 image) acquired via the image acquisition system 20, and the set 16 of positions of transitions derived from the bar code image. The data 28 is transmitted to a computer 182 via a serial port 184 (e.g., an RS-232 port).

For the purpose of acquiring the bar code image, the control logic responds to signals from the processor to activate a framing illumination circuit 186 (e.g., a circuit producing a diffracted laser beam) to allow the scanning system to be aimed, and an image illumination circuit 188 (e.g., a circuit including an LED array) to illuminate the bar code symbol 14. In the image acquisition system 20, image data is derived in the CCD imager 24 by an analog-to-digital converter circuit 192 from signals produced by a CCD circuit 190 from light captured by the lens apparatus (e.g., a passive fixed lens), which image data is passed to the control logic to form the bar code image in the memory.

The image analysis system, the bar code interpretation system, the image acquisition system, and the framing and image illumination systems may be arranged in a single scanner unit 192 that may be a handheld scanner. Alternatively, the computer may provide at least the processor and memory circuits so that the procedures described above are executed in the computer according to computer software loaded in the computer, with the computer's keyboard or mouse or a sensor device serving as the trigger circuit.

In any case, the techniques (i.e., the procedures described above) may be implemented in hardware or software, or a combination of both. In at least some cases, it is advantageous if the techniques are implemented in computer programs executing on programmable computers that each include a processor, a storage medium readable by the processor (including volatile and non-volatile memory and/or storage elements), at least one input device such as a keyboard, and at least one output device. Program code is applied to data entered using the input device to perform the procedure described above and to generate output information. The output information is applied to one or more output devices.

In at least some cases, it is advantageous if each program is implemented in a high level procedural or object-oriented programming language such as ANSI C to communicate with a computer system. The programs can be implemented in assembly or machine language, if desired. In any case, the language may be a compiled or interpreted language.

In at least some cases, it is advantageous if each such computer program is stored on a storage medium or device (e.g., ROM or magnetic diskette) that is readable by a general or special purpose programmable computer for configuring and operating the computer when the storage medium or device is read by the computer to perform the procedures described in this document. The system may also be considered to be implemented as a computer-readable storage medium, configured with a computer program, where the storage medium so configured causes a computer to operate in a specific and predefined manner.

Other embodiments are within the scope of the following claims. For example, the image analysis system may be applied to a brightness curve produced by a laser scanning bar code reader. One or more of the procedures for processing blurred signals may be used independently, e.g., without a preceding execution of the procedure for determining whether the signal is slightly, moderately, or severely blurred.

The invention applies to all types of signals, including analog signals representing images. For example, one or more of the procedures described above may be applied to an analog electrical signal containing information representative of reflected light from indicia (e.g., a bar code symbol) including regions of different light reflectivity (e.g., the dark and light portions described above). An analog scan signal may be produced that is representative of light sensed from the bar code symbol, and at least one of the procedures described above may be applied to the analog scan signal. The analog electrical signal need not literally be an analog signal; it can be represented by a sampled (and thus digital) signal.

What is claimed is:

1. A method for use in processing an analog electrical signal containing information representative of reflected light from indicia including regions of different light reflectivity, wherein the analog electrical signal contains edge transitions corresponding to boundaries between adjoining regions of different light reflectivity of the indicia, comprising the steps of:
   analyzing the edge transitions of at least a part of the analog electrical signal to determine a level of blur in that part of the analog electrical signal; and
   based on the determined level of blur, selecting one of a plurality of different techniques for processing that part of the analog electrical signal to produce a digitized electrical signal in which transitions in the digital level of the signal correspond to boundaries between adjoining regions of different light reflectivity of the indicia.

2. The method of claim 1 wherein the step of analyzing the edge transitions is performed on a plurality of different parts of the analog electrical signal and different digitizing techniques are used on the different parts of the analog signal depending on the level of blur in the different parts of the analog signal.

3. The method of claim 1, further comprising
   ranking the edge transitions by magnitude; and
   analyzing the ranked edge transitions to detect the extent of blur represented in the part of the analog electrical signal.

4. The method of claim 3 wherein the ranking is done by forming a histogram of the magnitudes of the edge transitions.

5. The method of claim 3, further comprising
   if the part of the analog electrical signal has edge transitions of substantially different magnitudes, determining that significant blur is represented in that part of the analog electrical signal.

6. The method of claim 5, further comprising
   rejecting edge transitions having less than a threshold magnitude.

7. The method of claim 5, further comprising
   grouping the edge transitions into sets by magnitude; and
   testing whether the difference between a first magnitude associated with a first set and a second magnitude associated with a second set is substantially equal to the difference between the first magnitude and a third magnitude associated with a third set.

8. A method for use in processing an analog electrical signal containing information representative of reflected light from indicia including regions of different light reflectivity, wherein the analog electrical signal contains edge transitions corresponding to boundaries between adjoining regions of different light reflectivity of the indicia, comprising the steps of:
   determining whether an edge transition corresponds to a boundary between adjoining regions of substantially equal width; and
   based on the determination, producing a digitized electrical signal in which transitions in the digital level of the signal correspond to the boundaries between adjoining regions of different light reflectivity of the indicia.

9. The method of claim 8, further comprising
   determining whether at least a part of the analog electrical signal is inconsistent with an alternating dark-and-light feature of a bar code symbol.

10. The method of claim 9, further comprising
    if the inconsistency is found, rejecting at least that part of the analog electrical signal.

11. The method of claim 8, further comprising
    determining whether a part of the analog electrical signal crosses a magnitude threshold more than once.

12. The method of claim 11, further comprising
    if the part is found to cross the magnitude threshold more than once, rejecting at least the part of the analog electrical signal.

13. The method of claim 8, further comprising
    determining the extent to which an edge transition that corresponds to a boundary between two adjoining regions of different widths is affected by one of the regions.

14. A method for use in processing an analog electrical signal containing information representative of reflected light from indicia including regions of different light reflectivity, wherein the analog electrical signal contains edge transitions corresponding to boundaries between adjoining regions of different light reflectivity of the indicia, comprising the steps of:

determining that the analog electrical signal contains edge transitions corresponding to less than all of the boundaries between the adjoining regions of different light reflectivity of the indicia;

for at least part of the analog electrical signal, determining the number of boundaries that lack corresponding edges;

determinig information about the relative positioning of the boundaries that lack corresponding edge transitions;

based on the determination about the number of boundaries that lack corresponding edges and their relative positioning, producing a digitized electrical signal in which transitions between the digital level of the signal correspond to boundaries between regions of different light reflectivity of the indicia.

15. The method of claim 14, further comprising determining information about the relative positioning of the boundaries that lack corresponding edge transitions.

16. The method of claim 14, further comprising determining information about the relative positioning of at least three boundaries that lack corresponding edge transitions.

17. The method of claim 14, further comprising determining information about the relative positioning of boundaries that lack corresponding edge transitions, between regions of dissimilar light reflectivity of the indicia.

18. The method of claim 17, wherein the relative positioning is determined with respect to intermediate points in the regions.

19. The method of claim 14, further comprising determining information about the relative positioning of boundaries that lack corresponding edge transitions, between regions of similar light reflectivity of the indicia.

20. The method of claim 19, wherein the relative positioning is determined with respect to intermediate points in the regions.

21. A method for use in processing an analog electrical signal containing information representative of reflected light from indicia including regions of different light reflectivity, wherein the analog electrical signal contains edge transitions corresponding to boundaries between adjoining regions of different light reflectivity of the indicia, comprising the steps of:

determining the relative heights of edge transitions in the analog electrical signal; and depending on the relative heights, selecting one of a plurality of different techniques for processing the electrical signal to produce a digitized electrical signal in which transitions in the digital level of the signal correspond to boundaries between adjoining regions of different light reflectivity of the indicia.

22. A method for use in processing an analog electrical signal containing information representative of reflected light from indicia including regions of different light reflectivity, wherein the analog electrical signal contains edge transitions corresponding to boundaries between adjoining regions of different light reflectivity of the indicia, comprising the steps of:

analyzing the edge transitions to classify at least a part of the analog electrical signal into one of three categories corresponding to slight, moderate, or severe levels of blur in that part of the analog electrical signal;

if the part of the analog electrical signal is classified into the category corresponding a slight level of blur or into the category corresponding to a moderate level of blur, based on half-height points in edge transitions in the analog electrical signal, determining information about the relative positions of boundaries between adjoining regions of different light reflectivity of the indicia;

if the part of the analog electrical signal is classified into the category corresponding a severe level of blur, based on a determination about the number of regions disposed between regions about which relative positioning information is known, determining information about the relative positions of boundaries between adjoining regions of different light reflectivity of the indicia; and based on the information determined about the relative positions, producing a digitized electrical signal in which transitions between the digital level of the signal correspond to boundaries between regions of different light reflectivity of the indicia.

23. A method of processing an analog electrical signal containing information representative of reflected light from indicia including regions of different light reflectivity, wherein the electrical signal contains edge transitions corresponding to boundaries between adjoining regions of different light reflectivity of the indicia, comprising the steps of:

processing the electrical signal to determine a set of possible edge transition points in said signal;

classifying at least some of the edge transition points against a predetermined amplitude and frequency threshold into at least two categories corresponding to the frequency spectrum or blur of the signal associated with each edge transition point; and separately processing each set of edge transition points in each category as a result of the classifying step, and combining the result producing a digitized electrical signal in which transitions between the digital level of the signal correspond to boundaries between regions of different light reflectivity of the indicia.

24. A method for use in processing an analog electrical signal containing information representative of reflected light from indicia including regions of different light reflectivity, wherein the analog electrical signal contains edge transitions corresponding to boundaries between adjoining regions of different light reflectivity of the indicia, comprising the steps of:

detecting edge transitions in the analog scan signal;

determining the level of blur in the vicinity of each of a plurality of edge transitions;

digitizing the edge transitions differently based on the determined level of blur in the vicinity of the edge transition;

combining the results of the digitizing step to produce a digitized electrical signal from the analog scan signal.

* * * * *